Feb. 1, 1938.    McLENNAN LENNARD    2,107,038
PROJECTION SCREEN
Filed April 8, 1937    2 Sheets-Sheet 1

Inventor
McLennan Lennard
By Willis F. Avery
Att'y

Feb. 1, 1938.   McLENNAN LENNARD   2,107,038
PROJECTION SCREEN
Filed April 8, 1937   2 Sheets-Sheet 2

Inventor
McLennan Lennard
By Willis F. Avery
Atty

Patented Feb. 1, 1938

2,107,038

UNITED STATES PATENT OFFICE 2,107,038

PROJECTION SCREEN

McLennan Lennard, Regent's Park, London, England

Application April 8, 1937, Serial No. 135,727
In Great Britain April 6, 1936

3 Claims. (Cl. 88—24)

This invention relates to projection screens such as are used for projecting moving pictures and has as its chief object to provide a projection screen upon which the projected image will appear clearer and more brilliant than upon screens heretofore used.

In the conventional flat-surfaced projection screen, light striking the screen is reflected, and not only toward the spectators, but also to some extent in the plane of the screen itself, illuminating to a certain extent an area surrounding that on which the light is projected. This defect is entirely overcome by the screens of this invention.

The projection screens of this invention are provided over their entire surface with a system of upstanding barriers with more or less sharp upper edges which prevent any lateral diffusion of the light striking the screen and thereby preserve the maximum possible brilliancy in the projected image.

Figure 1:
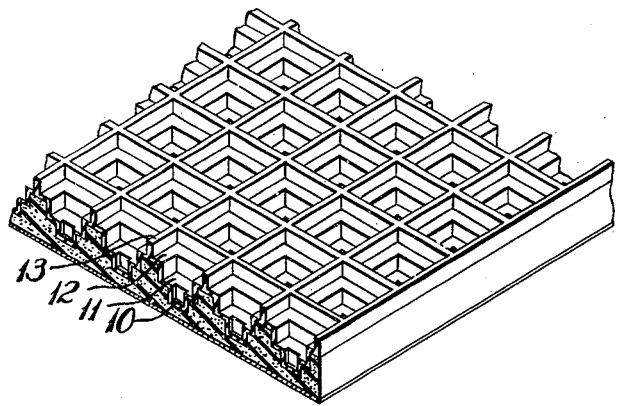
Figure 2:
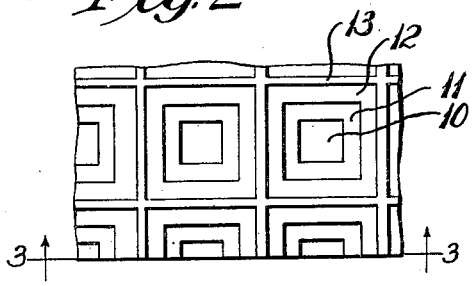
Figure 3:
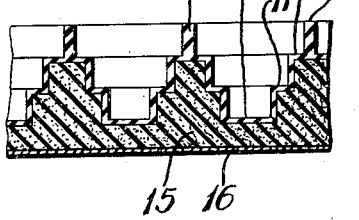

In the annexed drawings, Fig. 1 is a perspective view of a portion of a screen made in accordance with one embodiment of the invention, Fig. 2 is a perpendicular view and Fig. 3 is a sectional view of the same embodiment.

Figure 4:
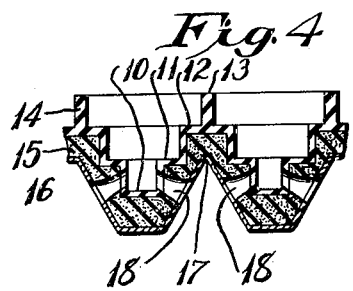
Figure 5:
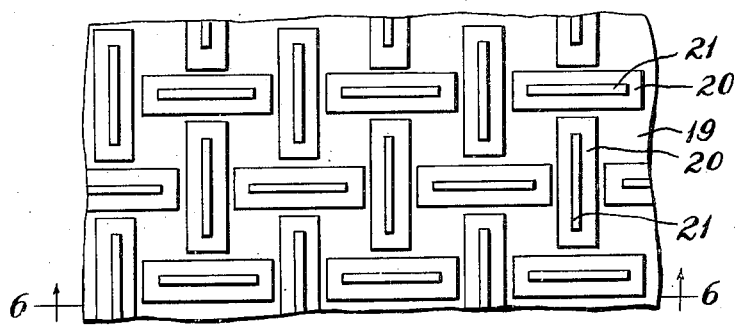
Figure 6:
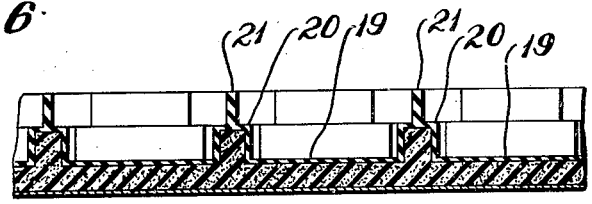

Fig. 4 represents a modification adapted for the projection of sound movies. Fig. 5 and Fig. 6 are views of a screen in which the barriers do not have a continuous upper surface, and Figs. 7, 8, 9, 10, 11 and 12 represent further modified forms of the screen.

The screen shown in Figs. 1, 2 and 3 has a reflecting surface made up of a series of cells, each of which has a base 10, one or more surrounding steps 11, 12, and a wall or barrier 13 separating it from the adjacent cells. Since these elements are each separated from the others, projected light falling on any one of them cannot illuminate any other, or corresponding elements in adjoining cells, hence areas on which no light is projected will remain completely dark even though very close to an intensely illuminated area. The light-receiving areas may be white or tinted and may have a smooth or matt surface, or a granular, pebbled, crinkled or other irregular surface as may be preferred for any particular installation.

The screen may be manufactured in any manner which will give the desired surface configuration. For example, a film of a suitable material 14, preferably rubber or similarly flexible material to permit the screen to be rolled for transportation, may be deposited on a molding surface having a configuration complementary to that of the screen, backed up by a filler 15, preferably a light, flexible material such as sponge rubber, and a flexible but substantially inextensible reinforcement 16, which may be a textile fabric.

If the screen is to be used in the projection of sound moving pictures with the speaker placed behind the screen as is usual, perforations should be provided for the transmission of the sound. The screen, a section of a small portion of which is shown in Fig. 4, is made up in the same manner as the screen of Figs. 1, 2 and 3, except that the back surface of the screen is provided with depressions, which may take the form of longitudinal channels 17 lying between the cells, and holes 18, 18 are then cut from the channels into the sides of the cells. This construction offers the peculiar advantage that the effective light reflecting area (and therefore the brilliancy of the image) is not reduced, as is the case when sound-transmitting perforations are made in ordinary flat-surface projection screens.

If desired, the projection screen may be so made up that the raised barriers instead of being continuous are discontinuous and the bases of the cells are continuous. Thus, in Figs. 5 and 6 the projection surface consists of a continuous base surface 19, on which are located elongated projecting blocks 20, 20 provided with longitudinal central ribs 21, 21, the blocks with their ribs being arranged in staggered rows in each of which the individual elements are disposed alternately longitudinally and transversely of the row so as to provide no path longer than a predetermined definite distance for the lateral diffusion of light striking any light-reflecting element of the screen.

Figure 7:
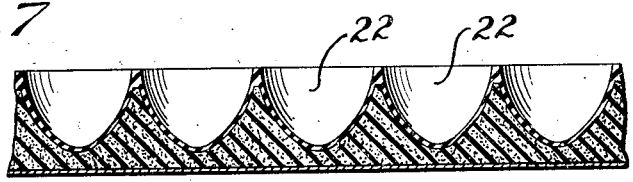
Figure 8:

It is obvious that the invention is not dependent upon any particular outline for the cells or barriers of the projection screen. The square outline and rectangular stepped section are preferred for some purposes, but the walls of the cells may be inclined or curved in parabolic or other curves if desired. Fig. 7 shows a section projection screen with cells 22, 22 having a curved cross section, and in Fig. 8 the cells are made up of successive curved steps 23, 24, 25.

Figure 9:
Figure 10:
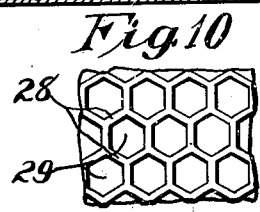
Figure 11:
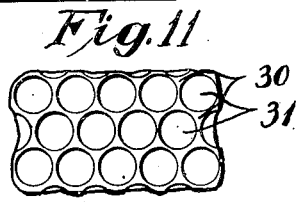
Figure 12:
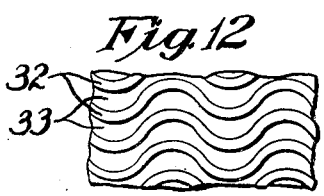

The barriers need not follow lines perpendicular one to another, but may also outline cells of triangular, hexagonal, circular or other desired configuration or even cells of irregular shape in random arrangement may be used. Furthermore, the raised barriers and the spaces between them may both be continuous if they are of a zig-zag or sinuous shape so that continuous light-paths are not formed. Thus, Fig. 9 shows a screen in which the barriers 26 outline triangular cells 27, Fig. 10 shows a screen in which the barriers 28 outline hexagonal cells 29, Fig. 11 shows a screen in which the barriers 30 outline circular cells 31, and Fig. 12 shows a screen in which sinuous barriers 32 separate similar sinuous reflecting surfaces 33, the barriers being of such curvature and so closely spaced that no continuous light-paths exist between them.

The size of the cells is dependent on the conditions under which the screens are to be used. They should not be so large as to become visible to the spectator and interfere with his perception of the projected image. For ordinary distances a cell diameter in the neighborhood of 4 mm. is suitable, but if the spectators are very close to the screen, considerably smaller cell units may be preferred.

The relation between the width and depth of the cells is also subject to variation. Very shallow cells are preferable if spectators are required to view the screen from a considerable angle. On the other hand, deep cells have the decided and unique advantage that lateral illumination does not strike the major part of the light-reflecting surface, so that the projection room may be provided with normal illumination, or at least sufficient illumination for spectators to perceive easily the arrangement of the room and its contents, without detracting noticeably from the brilliance of the projected image.

While the projection screen of this invention has been described above with reference to black and white projection, it will be recognized that in color projection it will not only preserve the full difference between areas of different light intensity, but will also keep separate and sharply distinct the areas on which different colors are projected and thus reproduce colored images with an unparalleled naturalness.

I claim:

1. An opaque projection screen in which the front surface is broken up into small elemental areas by closely spaced projecting barriers adapted to intercept laterally diffused light, the barriers being made up of a plurality of steps extending transversely of the screen, one set of faces of the steps being essentially parallel one to another and to the general plane of the front surface and the other set of faces being so inclined that substantially none of the projected light directly reaches them, the screen being provided with sound-transmitting apertures debouching in the lateral faces of the steps so that they are invisible from the front of the screen.

2. An opaque projection screen in which the front surface is broken up into small laterally enclosed cells by projecting barriers adapted to intercept laterally diffused light, the barriers being made up of a plurality of steps extending transversely of the screen, one set of faces of the steps being essentially parallel one to another and to the general plane of the front surface and the other set of faces being so inclined that substantially none of the projected light reaches them, the screen being provided with sound apertures debouching in the lateral faces of the steps so that they are invisible from the front of the screen.

3. An opaque projection screen in which the front surface is broken up into small square cells by projecting barriers adapted to intercept laterally diffused light and having continuous narrow upper edges, the barriers being made up of a plurality of rectangular steps extending transversely of the screen, one set of faces of the steps being parallel one to another and to the general plane of the front surface and the other set of faces being normal thereto, the screen being provided with sound apertures debouching in the lateral faces of the steps so that they are invisible from the front of the screen.

McLENNAN LENNARD.